(12) United States Patent
Walker et al.

(10) Patent No.: US 11,416,614 B2
(45) Date of Patent: Aug. 16, 2022

(54) STATISTICAL DETECTION OF FIRMWARE-LEVEL COMPROMISES

(71) Applicant: Dell Products L.P., Round Rock, TX (US)

(72) Inventors: Mark Aeden Walker, Round Rock, TX (US); Ricardo L. Martinez, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 196 days.

(21) Appl. No.: 16/918,791

(22) Filed: Jul. 1, 2020

(65) Prior Publication Data
US 2022/0004636 A1    Jan. 6, 2022

(51) Int. Cl.
  *G06F 21/57*    (2013.01)
  *G06F 21/56*    (2013.01)

(52) U.S. Cl.
  CPC .......... *G06F 21/572* (2013.01); *G06F 21/566* (2013.01); *G06F 2221/033* (2013.01)

(58) Field of Classification Search
  CPC . G06F 21/572; G06F 21/566; G06F 2221/033
  See application file for complete search history.

(56) References Cited

U.S. PATENT DOCUMENTS

| | | | | |
|---|---|---|---|---|
| 11,321,077 B1 * | 5/2022 | Sakthikumar | ......... | H04L 9/3247 |
| 2004/0158828 A1 * | 8/2004 | Zimmer | ................ | G06F 9/4401 711/170 |
| 2009/0086981 A1 * | 4/2009 | Kumar | ................... | G06F 21/575 726/2 |
| 2011/0214186 A1 * | 9/2011 | Khilnani | ............... | G06F 21/575 726/24 |
| 2011/0219453 A1 * | 9/2011 | Turbin | .................... | G06F 21/00 713/2 |
| 2011/0307711 A1 * | 12/2011 | Novak | .................. | G06F 21/575 713/188 |
| 2012/0151582 A1 * | 6/2012 | Reasor | .................. | G06F 21/565 726/23 |
| 2013/0276128 A1 * | 10/2013 | Konetski | ................. | G06F 21/10 726/26 |
| 2014/0068585 A1 * | 3/2014 | Young | ................... | G06F 21/572 717/168 |
| 2014/0351935 A1 * | 11/2014 | Shao | ...................... | G06F 21/575 726/23 |
| 2015/0220736 A1 * | 8/2015 | Martinez | ................. | G06F 21/64 711/163 |
| 2016/0048694 A1 * | 2/2016 | Martinez | ............... | G06F 21/575 713/193 |
| 2016/0070913 A1 * | 3/2016 | Kulkarni | ............... | G06F 9/4401 713/2 |

(Continued)

*Primary Examiner* — Aurel Prifti
(74) *Attorney, Agent, or Firm* — Kirton McConkie; Brian Tucker

(57) ABSTRACT

Statistical detection of firmware-level compromises can be enabled and performed on a computing system. During pre-boot, a pre-boot agent can access firmware loaded in memory and cause it to be stored in a manner that will allow the firmware to be accessed at runtime. During runtime, the firmware can be accessed and stored as files in the file system or other storage location accessible to an antivirus solution. The antivirus solution can then analyze the files using statistics-based techniques to thereby detect compromises in firmware.

20 Claims, 9 Drawing Sheets

(56) References Cited

U.S. PATENT DOCUMENTS

| | | | |
|---|---|---|---|
| 2016/0180094 A1* | 6/2016 | Dasar | G06F 9/4406 |
| | | | 714/36 |
| 2016/0202964 A1* | 7/2016 | Butcher | G06F 9/4416 |
| | | | 717/172 |
| 2016/0217282 A1* | 7/2016 | Vecera | G06F 21/50 |
| 2016/0364243 A1* | 12/2016 | Puthillathe | G06F 9/4406 |
| 2017/0243000 A1* | 8/2017 | Shraim | H04L 9/00 |
| 2018/0006815 A1* | 1/2018 | Young | G06F 12/1408 |
| 2018/0032734 A1* | 2/2018 | Gunti | G06F 21/575 |
| 2018/0322313 A1* | 11/2018 | Yao | G06F 21/44 |
| 2020/0104506 A1* | 4/2020 | Kallenberg | G06F 9/4411 |
| 2020/0257521 A1* | 8/2020 | Jayakumar | G06F 9/4401 |
| 2021/0026967 A1* | 1/2021 | Suryanarayana | G06F 21/575 |
| 2021/0182078 A1* | 6/2021 | Rietschin | G06F 9/45558 |
| 2021/0240488 A1* | 8/2021 | Suryanarayana | G06F 9/4406 |
| 2021/0374005 A1* | 12/2021 | Muthaiyan | G06F 21/57 |

* cited by examiner

STATISTICAL DETECTION OF FIRMWARE-LEVEL COMPROMISES

CROSS-REFERENCE TO RELATED APPLICATIONS

N/A

BACKGROUND

BIOS firmware (BIOS) is the first software that is executed on the central processing unit (CPU) when a computing system is powered on. The primary task of the BIOS is to initialize the hardware and load the operating system (OS). As part of this process, other types of firmware may also be executed. Accordingly, for purposes of this specification and the claims, the term firmware will be used to generally represent conventional (legacy) BIOS, Unified Extensible Firmware Interface (UEFI) BIOS, similar firmware that is used to boot a computing system and firmware of other hardware that a computing system may have (e.g., network card firmware, video card firmware, storage device firmware, etc.). In short, firmware can be viewed as the executable code and data on a computing system that is loaded before the operating system is loaded and may or may not remain loaded/running after the operating system is loaded.

FIG. 1 represents how such firmware can perform a boot process on a computing system. FIG. 1 will be described primarily in the context of the UEFI, but it should not be viewed as limiting the scope of firmware to UEFI. FIG. 1 depicts hardware 110 which can represent all of the various types of hardware that may exist on a computing system including flash 111. Flash 111, which may be in the form of Serial Peripheral Interconnect (SPI) flash, is commonly employed to store the boot block, which is the initial firmware that is loaded and executed when the computing system is powered on or resets (e.g., the code that the reset vector points to). Flash 111 may also typically store other portions of the BIOS firmware (e.g., UEFI variables).

During the PEI phase, PEIM modules (or drivers) are loaded to initialize the low level hardware such as the system memory. Additional UEFI services are also loaded and provide an interface for subsequent stages including the Driver Execution Environment (DXE) phase in which UEFI drivers are loaded to perform a variety of tasks. The boot process will then transition to the Boot Device Selection (BDS) phase where the GUID Partition Table (GPT) or Master Boot Record (MBR) is accessed to identify and load the OS boot loader. The OS boot loader will then load the OS kernel and transfer control the OS.

As is represented in FIG. 1A, some of the firmware that is loaded into memory during the boot process may be "static," meaning that it is the same at each boot. For example, when a particular module or driver is loaded into a region of memory, the binary values in the region of memory will be the same (or at least highly similar) at each boot. In contrast, other firmware that is loaded into memory during the boot process may be "dynamic," meaning that it may not necessarily be the same at each boot. For example, UEFI variables, BIOS configuration settings or other settings may be loaded/created in a region of memory in a different order, may have different values or may otherwise vary so that the binary values in the region of memory will not be the same or even similar at each boot. Stated another way and with reference to FIG. 1A, the memory region containing the driver at a first boot will bitwise match the memory region containing the driver at a second boot. In contrast, the memory region containing the BIOS configuration settings or UEFI variables at the first boot may not bitwise match the memory region containing the BIOS configuration settings or UEFI variables respectively at the second boot.

Because these various types of firmware are loaded and executed before the operating system, current antivirus and malware detection techniques, such as more advanced statistics-based techniques, are not available. More particularly, antivirus and malware solutions employ agents that run on the operating system and will therefore be unable to access the firmware in the manner required to perform statistics-based techniques. Additionally, statistics-based techniques typically employ a sandbox which would require resources that are not available within the pre-boot environment. For these reasons, the advances in antivirus and malware protection remain unavailable for detecting compromises in firmware.

Instead, firmware compromises are usually detected using trusted hash or signature-based techniques. Such signature-based techniques by definition require the overhead of verified comparators (available either locally or remotely) and only work well for memory regions that contain static firmware, leaving memory regions that contain dynamic firmware more susceptible to compromise. More particularly, compromises in a memory region containing static firmware can be detected by determining that the signature or hash of the firmware loaded in the memory region matches a known-correct signature or hash. However, for memory regions containing dynamic firmware, there likely will not be a known-correct signature or hash due to the variations in the firmware that will exist at each boot. With reference again to FIG. 1A, a signature of the memory region containing the BIOS configuration settings or UEFI variables may be different at each boot making it unfeasible to detect a compromise in the BIOS configuration settings or the UEFI variables using signature-based techniques. Accordingly, available techniques for detecting compromises in firmware are incomplete.

BRIEF SUMMARY

The present invention extends to methods, systems, and computer program products for enabling and performing statistical detection of firmware-level compromises. In other words, embodiments of the present invention can be employed to enable firmware to be analyzed using statistics-based techniques in a similar manner as files, applications and other components available in the operating system context are analyzed. In this way, the more advanced statistics-based antivirus and malware detection techniques can be extended to firmware, including portions of firmware that are not the same at each boot.

In some embodiments, the present invention may be implemented as a method for analyzing firmware. During pre-boot, firmware stored in one or more regions of memory can be accessed. This firmware can then be stored in one or more separate regions of memory that remain accessible at runtime. During runtime, the firmware that is stored in the one or more separate regions of memory can be accessed and then stored as one or more files in a file system at a location accessible to an antivirus solution to thereby enable the antivirus solution to perform a statistical analysis on the one or more files to detect a compromise in the firmware.

In some embodiments, the present invention may be implemented as computer storage media which stores computer executable instruction which when executed on a computing system implement a method for analyzing firmware which includes: accessing one or more portions of firmware that are stored in one or more regions of memory during pre-boot; storing the one or more portions of firmware in memory in a manner that causes the one or more portion of firmware to remain accessible during runtime; and storing the one or more portions of firmware as one or more files in a file system during runtime to thereby enable an antivirus solution to perform a statistical analysis on the one or more files to detect a compromise in the firmware.

In some embodiments, the present invention may be implemented as a computing system that includes one or more processors and one or more computer storage media which store computer executable instructions. When the computer executable instructions are executed by the one or more processors, a method for enabling firmware to be analyzed at runtime may be implemented. This method may include: loading, during pre-boot, a pre-boot agent; identifying, by the pre-boot agent, a memory region that stores firmware; causing, by the pre-boot agent, the firmware stored in the memory region to be copied to a portion of memory that remains accessible at runtime; accessing, at runtime and by a runtime agent, the portion of memory that remains accessible at runtime to obtain the firmware; and storing the firmware as one or more files in a file system to thereby enable an antivirus solution to perform a statistical analysis on the one or more files to detect a compromise in the firmware.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
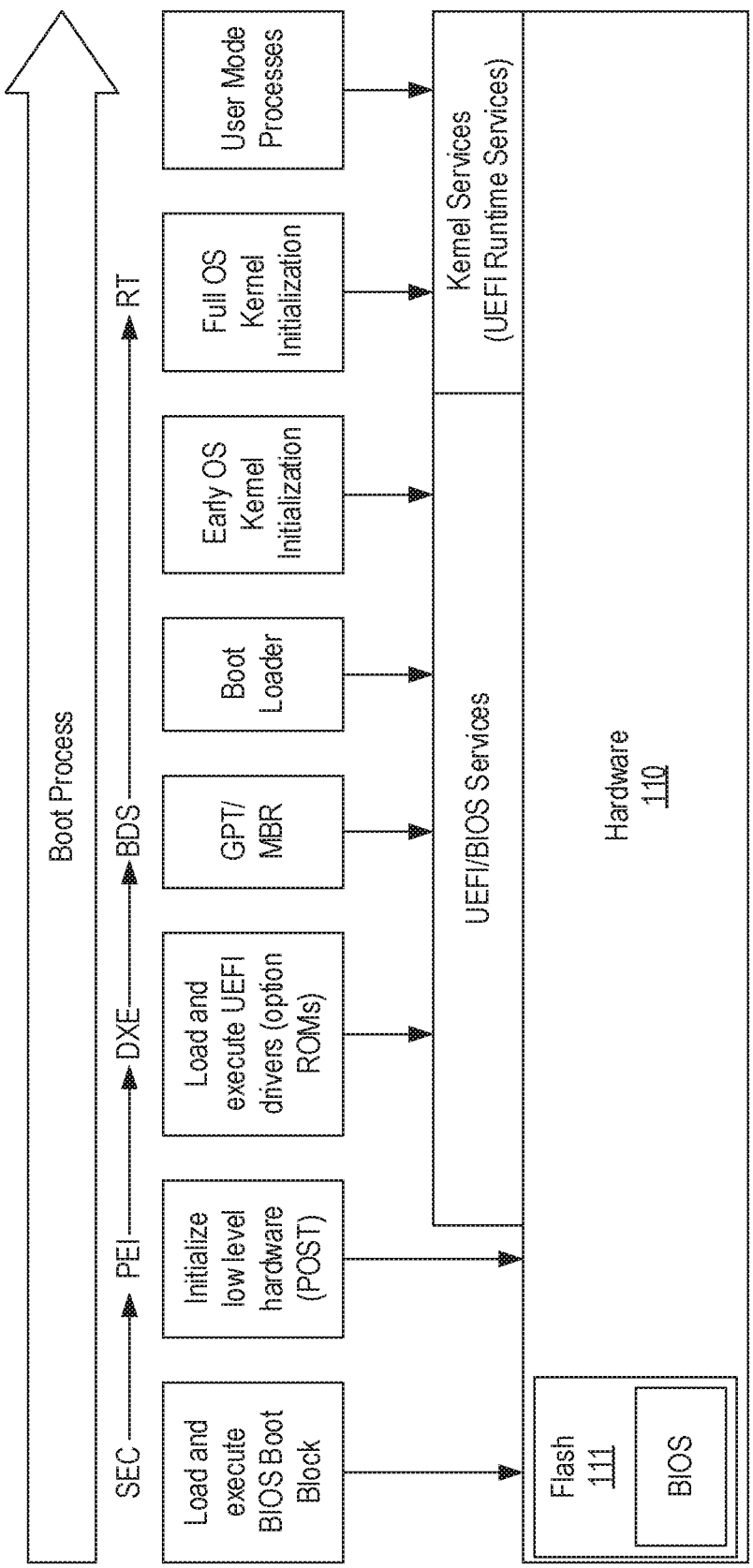
FIG. 1 illustrates an example of a typical boot process that can be performed on a computing system including various types of firmware that are involved in the typical boot process.
Figure 1A:
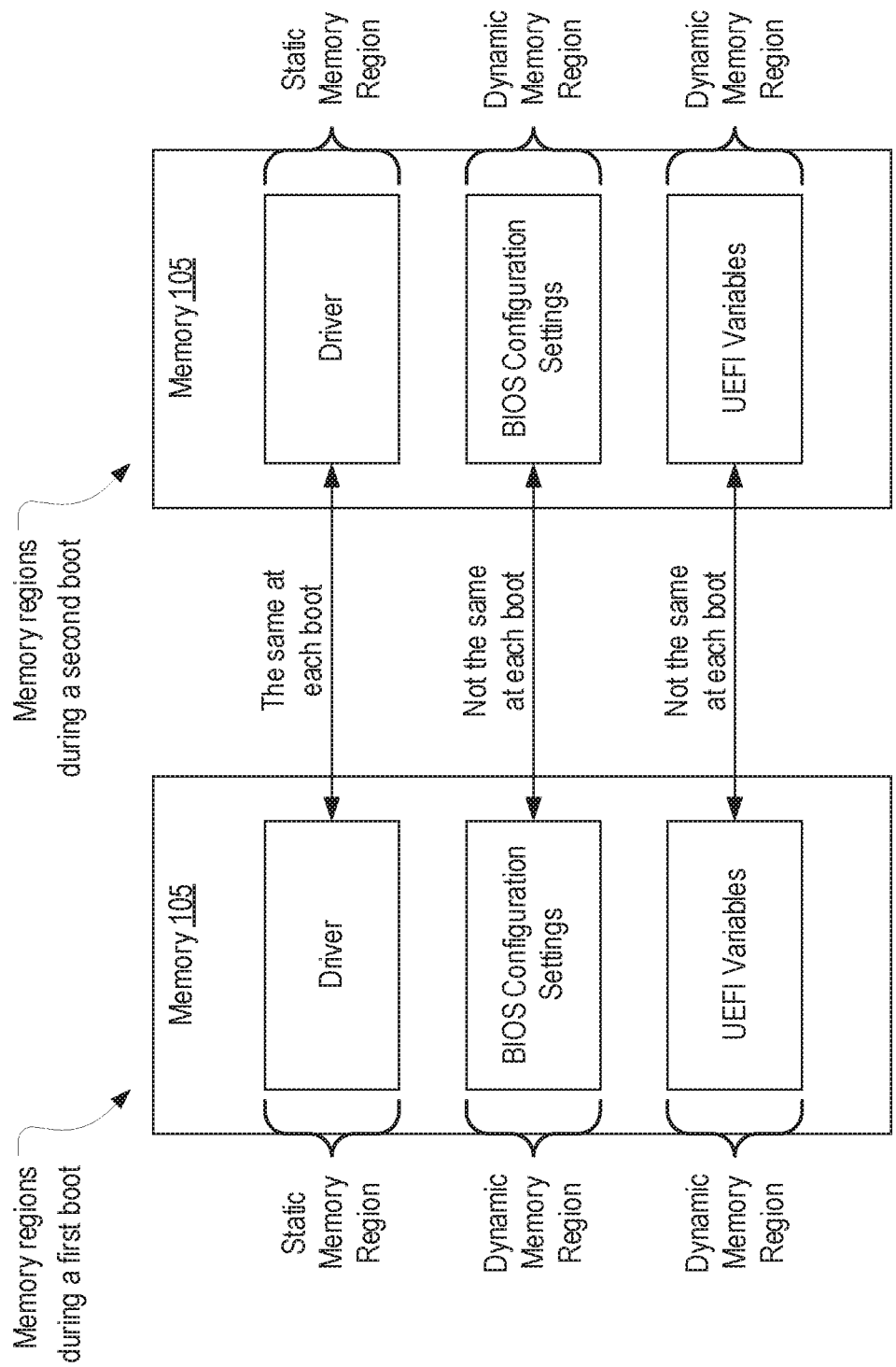
FIG. 1A illustrates an example of how certain portions of firmware may vary between boots thereby rendering signature-based compromise detection techniques unsuitable.
Figure 2:
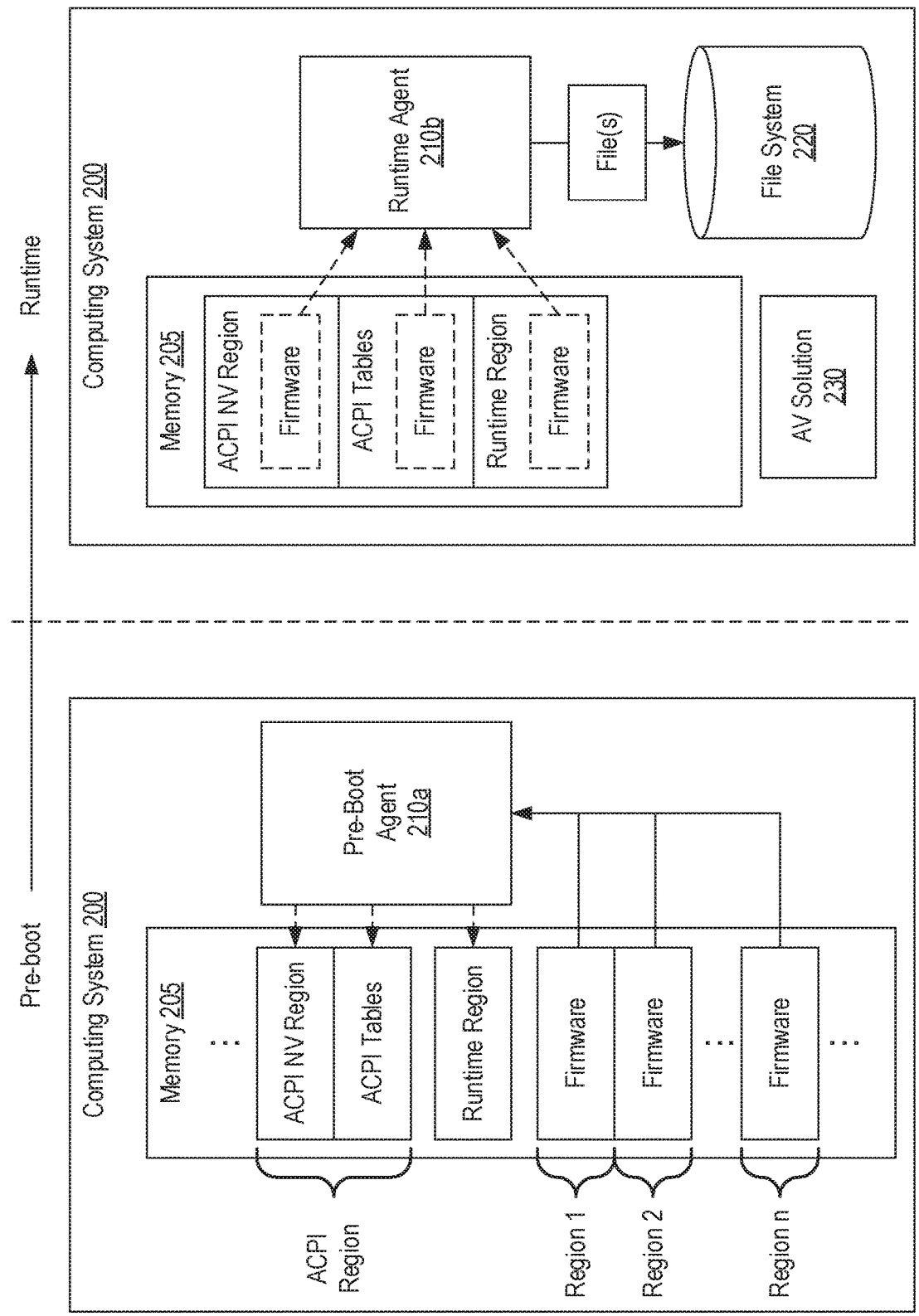
FIG. 2 illustrates an example configuration of a computing system on which embodiments of the present invention may be implemented.

FIG. 2 provides an example of various components that may be employed on a computing system 200 to enable embodiments of the present invention to be implemented. FIG. 2 represents computing system 200 at two different times: (1) during pre-boot (i.e., before the OS is loaded); and (2) runtime (i.e., after the OS is loaded). Computing system 200 is shown as including memory 205 which is used during pre-boot and at runtime. Notably, the majority of firmware that is loaded into memory 205 during pre-boot likely will not be retained in memory 205 after the operating system loads. For example, ACPI tables and any content stored in the ACPI non-volatile (NV) region of memory 205 will remain accessible to the OS, while other types of firmware may be stored in other regions of memory 205 which will not be maintained after the operating system is loaded unless they are designated as runtime regions (as represented by such regions being managed by the operating system). For example, the various types of UEFI firmware other than runtime services do not remain loaded once the boot process transitions to loading the operating system.

FIG. 2 represents that the firmware may be stored in any number of regions. Some of these regions may store static firmware (i.e., firmware that should be the same at each boot). On the other hand, some regions may store dynamic firmware (i.e., firmware that is expected to vary at each boot). As one example only, as part of the boot process, a UEFI image may request that a region of memory 205 be allocated for storing configuration settings and in response, any available region in memory 205 could be allocated. The UEFI image could then create or load UEFI variables, settings or other firmware in the allocated region of memory in a manner that causes the "image" in the memory region to be different at each boot.

Embodiments of the present invention may be implemented to enable firmware that is loaded in memory 205 during pre-boot to be analyzed in the form of a file after the operating system is loaded to thereby enable the use of statistics-based techniques. For example, as shown in FIG. 2, a pre-boot agent 210a may be included as part of the firmware of computing system 200 and can be configured to access the firmware stored in the various regions of memory 205 to cause the firmware to be stored in a manner that will make it accessible at runtime. A runtime agent 210b can execute during runtime to access the firmware that pre-boot agent 210a has made accessible and cause the firmware to be stored in the form of files in file system 220 where the files will be accessible to AV solution 230. In other words, runtime agent 210b can access the firmware that may be stored as an image (i.e., a copy of the in-memory firmware) and then cause the image to be stored as file(s) in file system 220. AV solution 230 can represent any solution that is configured to detect viruses, malware or any other type of compromise in a software component and may represent any of the various common AV solutions (e.g., Microsoft Defender, Symantec, etc.) or a custom AV solution. Also, in some embodiments, pre-boot agent 210a and/or runtime agent 210b could be part of AV solution 230.

Pre-boot agent 210a can be configured in any suitable manner (e.g., as a DXE module, a UEFI runtime service, etc.). Therefore, embodiments of the present invention should not be limited to any particular form of pre-boot agent 210a but should be construed in accordance with the functionality that pre-boot agent 210a may perform. Of importance is that pre-boot agent 210a runs during the pre-boot process and will therefore have access to the firmware while it is loaded into memory 205. As represented in FIG. 2, pre-boot agent 210a may be configured to store the firmware in a number of different locations such as in the ACPI non-volatile (NV) region of memory 205, as part of the ACPI tables, in a runtime region of memory, etc.

Figure 2A:
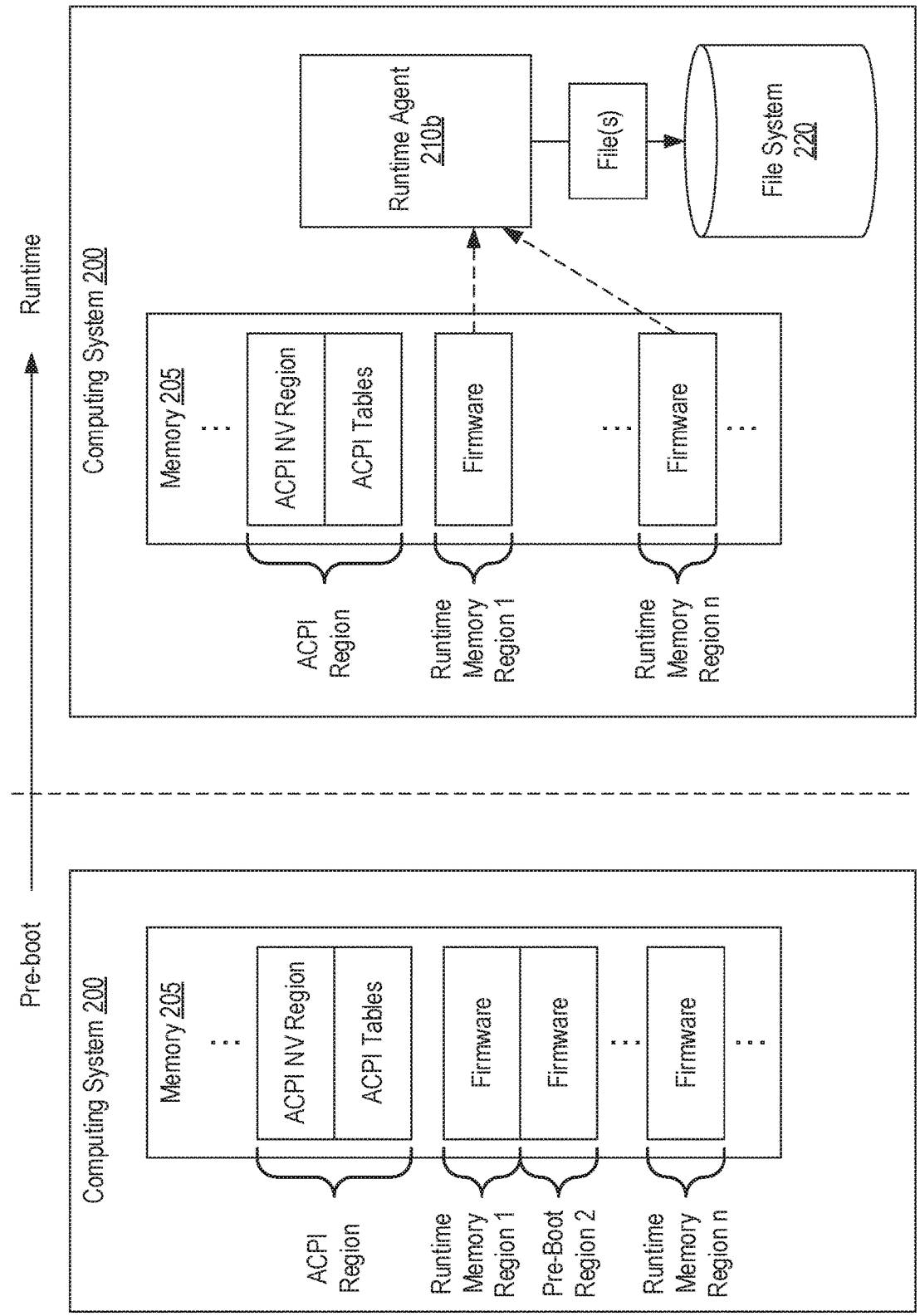
FIG. 2A illustrates another example configuration of a computing system on which embodiments of the present invention may be implemented.

FIG. 2A represents a slightly different configuration in which pre-boot agent 210a is not employed. In such embodiments, runtime agent 210b can access any firmware that remains available after pre-boot (e.g., the contents of any region of memory employed by a UEFI runtime service) and can cause the firmware to be stored in the form of files in file system 220. Although such embodiments may not enable the full scope of firmware to be evaluated using AV solution 230, they may still enhance protection for some portions of firmware (e.g., a UEFI variable store).

Figure 3A:
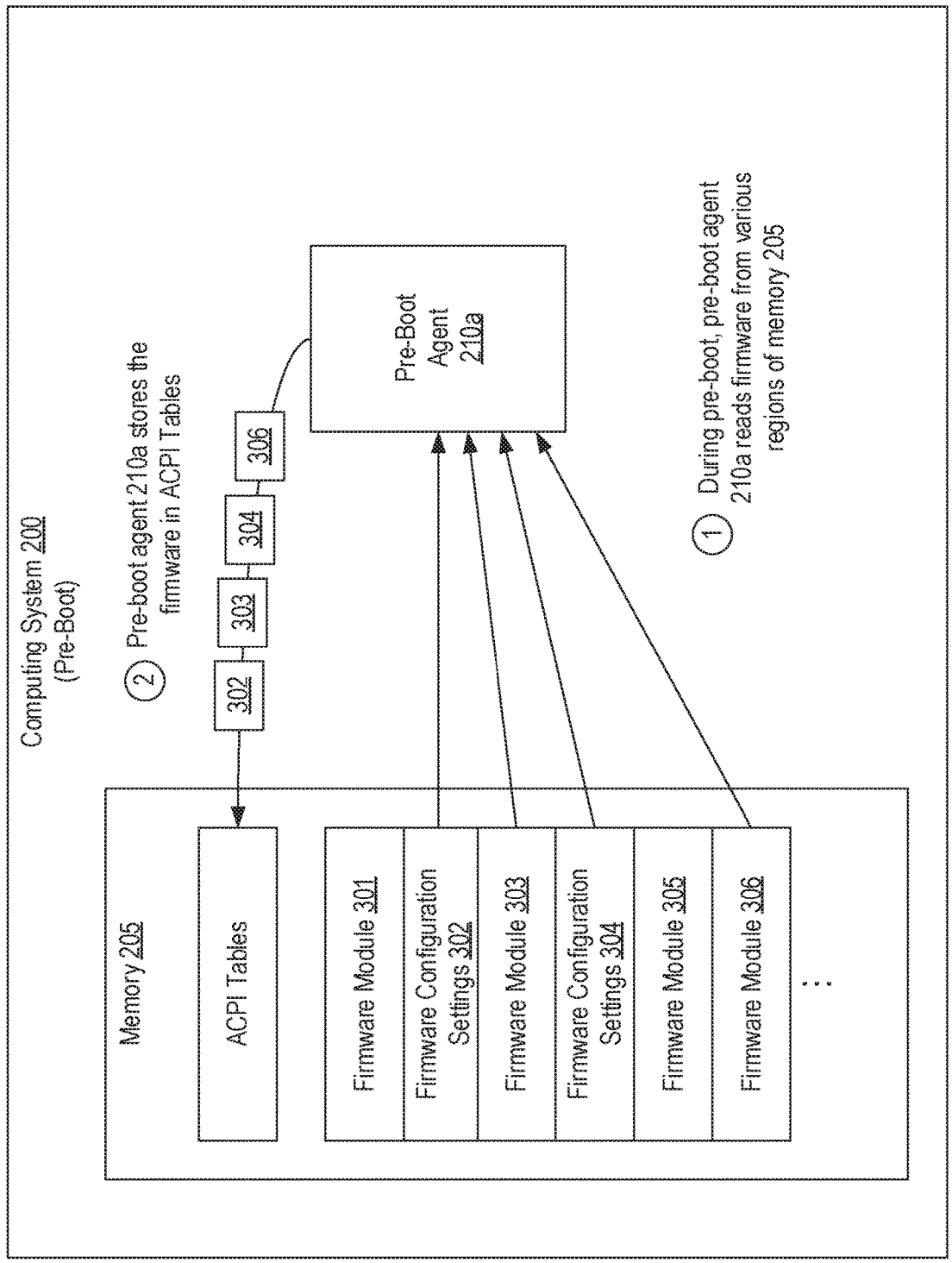
FIGS. 3A-3C provide an example of how firmware can be made accessible to an antivirus solution.
Figure 3B:
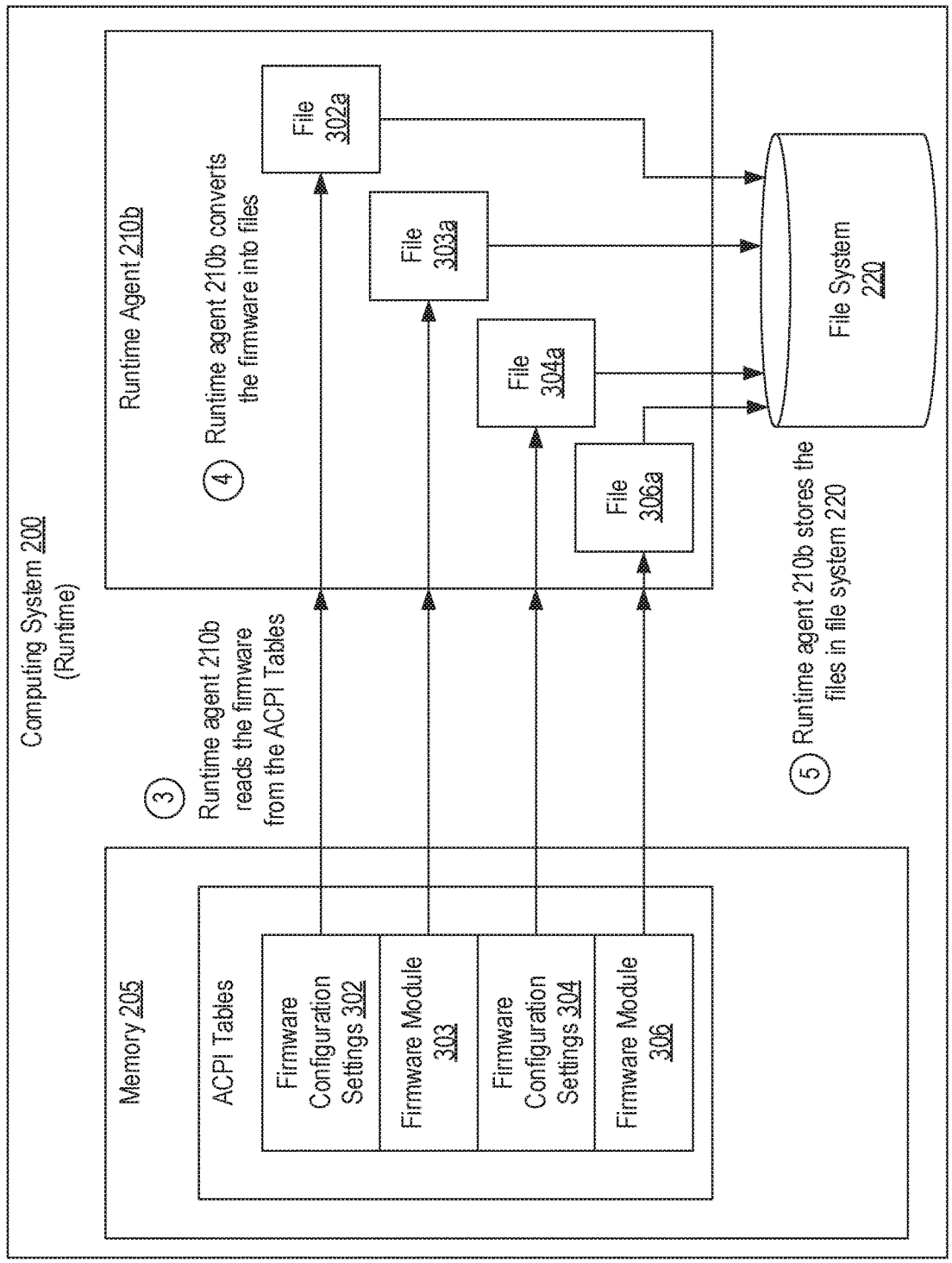
Figure 3C:
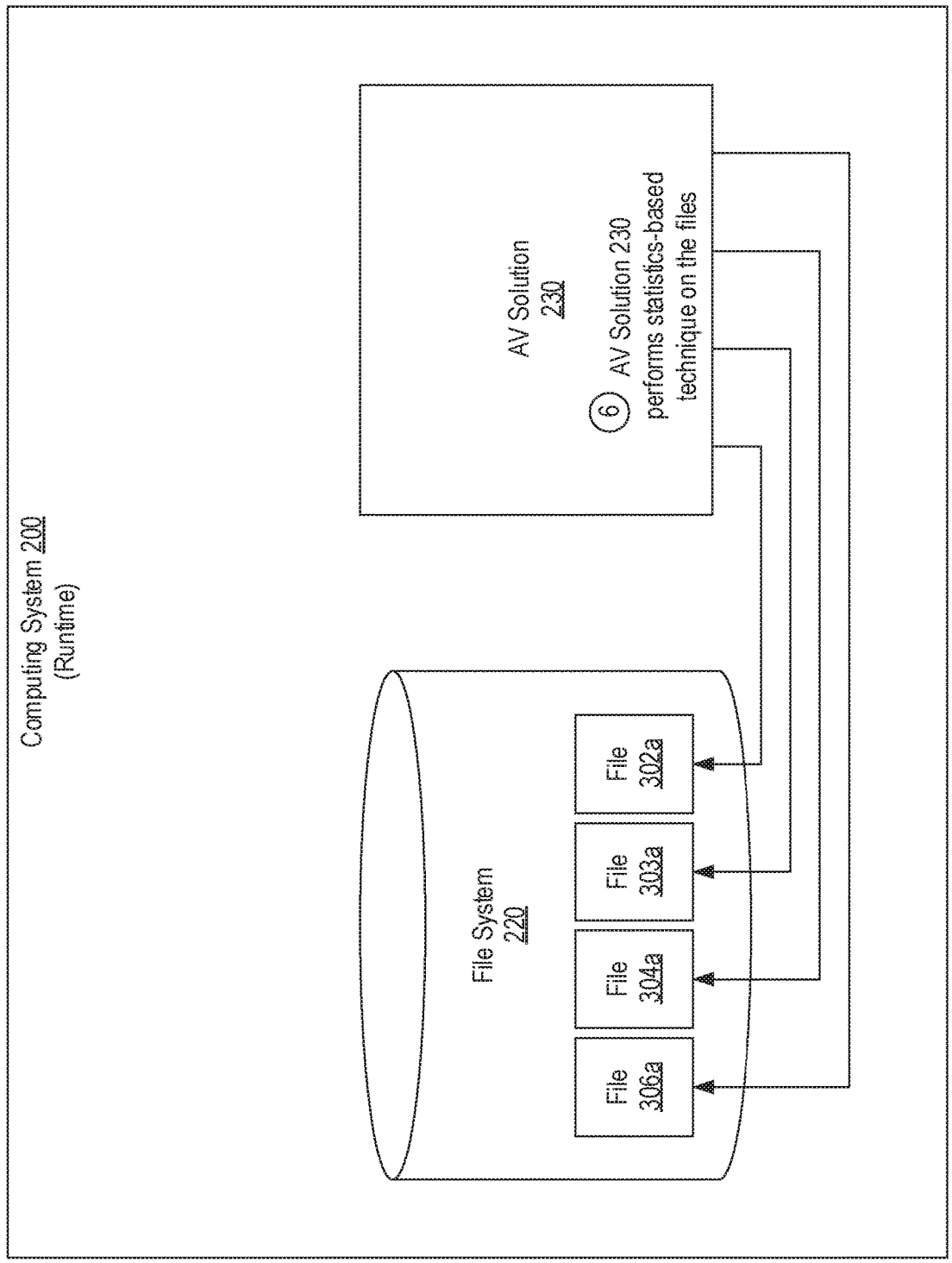

FIGS. 3A-3C provide an example of how pre-boot agent 210a and runtime agent 210b may cause firmware to be stored as files in file system 220 in accordance with some embodiments of the present invention. In this example, the ACPI tables may be employed to maintain the firmware after the operating system is loaded.

As shown in FIG. 3A, it is assumed that memory 205 stores ACPI tables, various firmware modules including firmware module 301, firmware module 303, firmware module 305 and firmware module 306, and various firmware configuration settings including firmware configuration settings 302 and firmware configuration settings 304. In this context, the term "firmware module" is intended to represent any executable code that may run during pre-boot. Therefore, these firmware modules could represent one or more PEI modules, one or more DXE drivers, or any other type of EFI image. These firmware modules need not be loaded in memory 205 at the same time. The term "firmware configuration settings" is intended to represent a group of configuration settings used by firmware during pre-boot. For example, firmware module 301 may load and employ firmware configuration settings 302 as part of its execution. In short, firmware modules may be viewed as the code while firmware configuration settings may be viewed as the data that the code uses.

As represented by step 1 in FIG. 3A, pre-boot agent 210a can read the various firmware from memory 205. Pre-boot agent 210a may do so at the same time or at different times during pre-boot. For example, pre-boot agent 210a could be configured to execute at a particular stage of the pre-boot process. As another example, pre-boot agent 210a could be loaded early in the pre-boot process and could be configured to be notified when a firmware module is to be loaded or unloaded, and in response, may read the firmware module from memory 205 and/or any data that the firmware module loads or creates in memory 205. As represented in FIG. 3A, pre-boot agent 210a need not read all of the firmware that may be loaded in memory 205 during pre-boot. For example, pre-boot agent 210a may be configured to read selected firmware such as any firmware that exhibits variations from one boot to the next. On the other hand, pre-boot agent 210a may not be configured to read any firmware that should remain the same at each boot since existing signature or hash-based techniques may be sufficient to identify a compromise. However, embodiments of the present invention should not be limited to implementations where pre-boot agent 210a only reads selected firmware.

In some embodiments, pre-boot agent 210a can identify the portions of memory 205 where firmware is loaded using a variety of techniques. In some cases, a portion of firmware may be loaded in the same memory range at each boot. In such cases, pre-boot agent 210a can be configured to read the firmware stored in those memory regions (e.g., the content stored in a static range of memory addresses). In other cases, pre-boot agent 210a may access the UEFI memory map to identify and read any allocated memory regions of a particular type. For example, pre-boot agent 210a could read the memory map to identify memory region(s) where a firmware module is stored (e.g., regions having EFI_MEMORY_TYPE set to EfiBootServicesCode) or where a firmware module's data (such as firmware configuration settings) is stored (e.g., regions having EFI_MEMORY_TYPE set to EfiBootServicesData). These are merely examples, and embodiments of the present invention should not be limited to any particular technique for identifying which memory regions contain firmware that should be read as part of step 1.

In step 2, pre-boot agent 210a can store the firmware it read in step 1 in the ACPI tables. In this context, storing firmware in the ACPI tables should be construed as including storing a reference or pointer to the firmware in the ACPI tables. In the depicted example, it is assumed that, in step 1, pre-boot agent 210a read firmware configuration settings 302, firmware module 303, firmware configuration settings 304 and firmware module 306 and therefore, in step 2, pre-boot agent 210a is depicted as storing these four portions of firmware in the ACPI tables. Of course, as mentioned above, pre-boot agent 210a could copy all firmware, a single portion of firmware or any other number of portions of firmware from the regions of memory into the ACPI tables as part of steps 1 and 2.

Although not shown, as part of storing the firmware, pre-boot agent 210a can provide an identification of what the firmware is. For example, if firmware configuration settings 302 were a particular set of BIOS configuration settings, pre-boot agent 210a could store an identification of the particular set of BIOS configuration settings in conjunction with storing the "image" of the memory region containing the particular set of BIOS configuration settings. As described further below, this will enable runtime agent 210b to create a file containing the firmware that can also provide proper context of what the file contains (e.g., by naming the file with the identifier).

Pre-boot agent 210a can store the firmware in the ACPI tables in any suitable manner. For example, pre-boot agent 210a could add the firmware to an existing (or currently defined) table or could create a custom table for storing the firmware. As one example only, pre-boot agent 210a could store the firmware as the payload of a Portable Executable image and then employ the Windows Platform Binary Table (WPBT) to provide the operating system with a pointer to the Portable executable image.

Regardless of how pre-boot agent 210a stores the firmware in the ACPI tables, the firmware will be maintained and available after the operating system is loaded. Notably, the firmware that pre-boot agent 210a stores in the ACPI tables may be in the form of raw data (e.g., pre-boot agent 210 can copy the binary values from the memory regions into the ACPI tables or store a pointer to the binary values in the ACPI tables). In some embodiments, the different portions of firmware may be stored in a manner that allows each different portion to be identified and accessed at runtime. In other embodiments, all firmware may be stored as a single "block" of data. However, storing each firmware separately enables a statistics-based detection technique to be performed at a more granular level (e.g. on firmware configuration settings 302 and separately on firmware module 303, etc. as opposed to on a single block that includes firmware 302-306). In some embodiments, each firmware that is stored in step 2 may be stored as a separate "definition block" in the ACPI tables. In some embodiments, pre-boot agent 210a may compress each firmware prior to storing it in the ACPI tables.

Turning to FIG. 3B, it is now assumed that the operating system has been loaded on computing system 200 and runtime agent 210b is now executing. In step 3, runtime agent 210b can access the ACPI tables to read the firmware that pre-boot agent 210a stored therein. Runtime agent 210b can employ any available technique to read the firmware from the ACPI tables. With reference to the WPBT example, runtime agent 210b could be in the form of the Portable Executable image or the Portable Executable image could invoke runtime agent 210b to access firmware that may have been stored in the payload of the Portable Executable image or in another accessible region of memory 205.

In the example depicted in FIG. 3B, runtime agent 210b can read firmware configuration settings 302, firmware module 303, firmware configuration settings 304 and firmware module 306 from the ACPI tables (whether directly or via a reference defined in the ACPI tables). In step 4, runtime module 210b can convert the firmware into files, and in step 5, store the files in file system 220. As an example in a Windows-based implementation, steps 4 and 5 can entail obtaining a FileStream for a new (or possibly existing) file in file system 220 and using the FileStream to write the content of the firmware to the file. The end result of steps 3-5 is that a file 302a containing firmware configuration settings 302, a file 303a containing firmware module 303, a file 304a containing firmware configuration settings 304 and a file 306a containing firmware module 306 may exist in file system 220.

As noted above, runtime module 210b may employ an identifier of the firmware as part of creating the file for the firmware. For example, runtime agent 210b could name the file it creates for a portion of firmware using an identifier that pre-boot agent 210a associated with the portion of firmware. As another example, runtime agent 210b could include the identifier in metadata of the file. In any case, by associating an identifier of the firmware with the file created for the firmware, AV solution 230 may be able to identify existing files that were previously created for the firmware and use such existing files in performing a statistics-based analysis. Similarly, AV solution 230 could use the identifier associated with a file to determine what type of analysis should be performed.

Turning to FIG. 3C, in step 6, AV solution 230 can access files 302a, 303a, 304a and 306a in file system 220 to perform statistics-based analysis on the files in a similar manner as AV solution 230 may perform statistics-based analysis on traditional files. For example, firmware configuration settings 302 may be expected to vary between reboots and therefore may not be adequately protectable using hash or signature-based techniques to identify a compromise. However, using the techniques of the present invention, firmware configuration settings 302—which may exist only during pre-boot—can be analyzed as if they were a traditional file in the operating system context to thereby enable the use of statistics-based techniques, such as byte-level statistical deviation, to identify the likelihood that a difference in such settings between reboots may be due to a compromise as opposed to the expected variations. In some embodiments, however, AV solution 230 may employ any other technique to analyze the files. Accordingly, although embodiments of the present invention may be primarily be used to enable AV solution 230 to perform statistical analysis to detect compromises in firmware, embodiments may be implemented regardless of the type of compromise detection technique AV solution 230 may perform. When AV solution 230 detects a statically significant deviation in the firmware, it can perform any suitable action including notifying a user or administrator, blocking future execution of the firmware, reverting the firmware to a known-safe version, etc.

In some embodiments, AV solution 230 may perform a statistics-based technique to analyze the files where the technique employs a historical comparison. In such cases, runtime agent 210b may be configured to store and retain files for particular firmware that are generated over time. For example, at each reboot, or at some defined interval, steps 1-5 could be performed to create a file containing the firmware as it exists at that particular reboot. With reference to firmware configuration settings 302, a file 302a1 could be created at a first time, a file 302a2 could be created at a second time, and so on. AV solution 230 could then compare the latest file to one or more previous files for the same firmware as part of a statistical deviation algorithm. As suggested above, by associating an identifier with the firmware, pre-boot agent 210a may enable runtime agent 210b to create files with the proper context that AV solution 230 may need to identify which previous files correspond with the file that is being analyzed.

In other embodiments or instances, such as when sufficient previous files do not yet exist, AV solution 230 could employ an explicit statistical algorithm that is not dependent or is less dependent on previous files. In some embodiments, AV solution 230 could employ a blended approach in which it first employs an explicit statistical algorithm initially and transitions over time to using a historical algorithm as the number of previous files increases.

Figure 4:
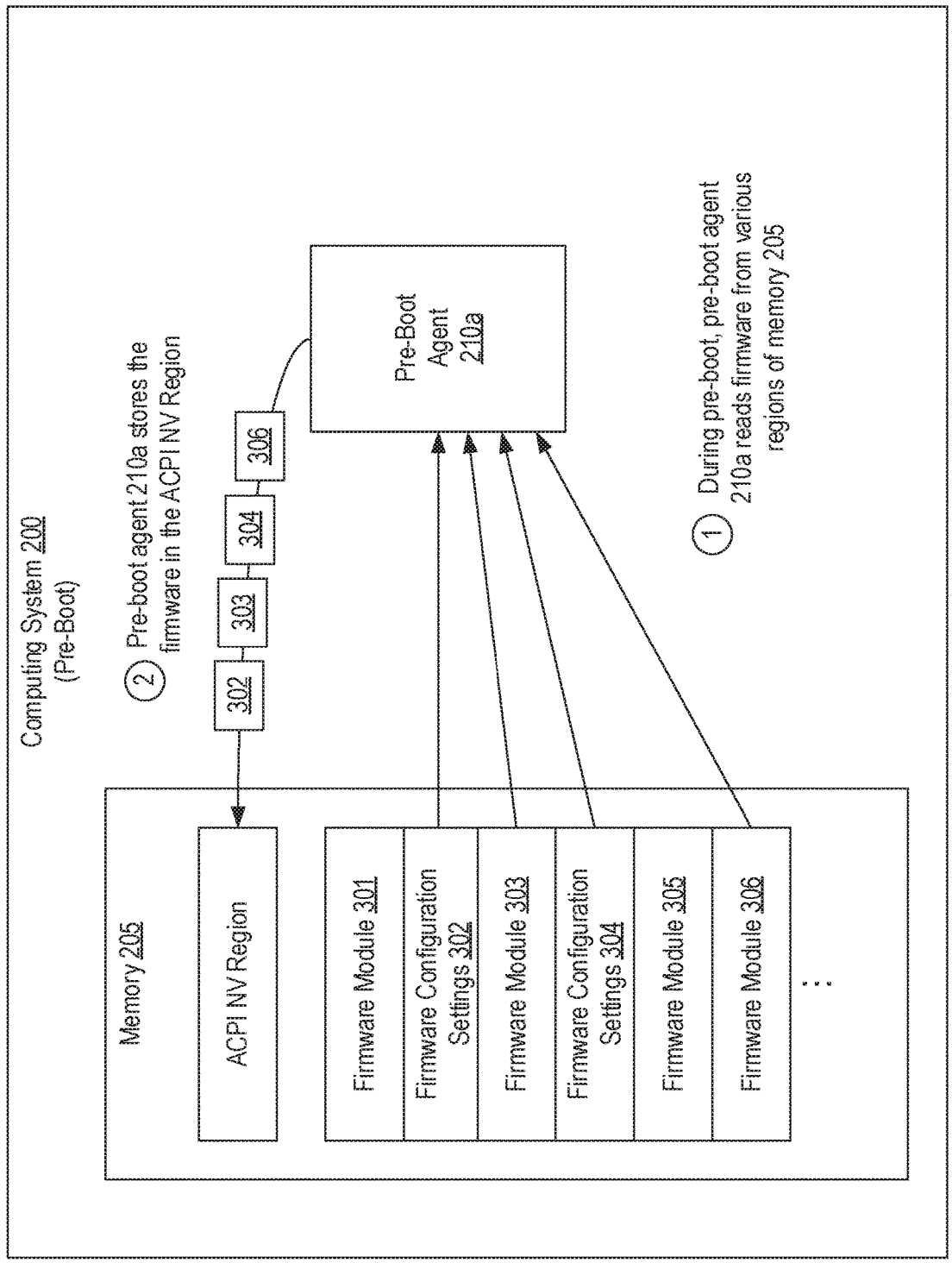
FIG. 4 provides another example of how firmware can be made accessible to an antivirus solution.

FIG. 4 is similar to FIG. 3A and represents that pre-boot agent 210a may store the firmware in the ACPI NV region as opposed to in the ACPI tables. In such cases, runtime agent 210b can read the firmware from the ACPI NV region in a similar manner as shown in FIG. 3B and store it in the form of files in file system 220. However, in some embodiments, AV solution 230 could be configured to access and analyze the firmware directly from the ACPI NV region. For example, pre-boot agent 210a could store the firmware in the ACPI NV region in a format that is understood by AV solution 230. In such cases, the firmware can be viewed as being stored in the form of a file in the ACPI NV region.

Figure 5:
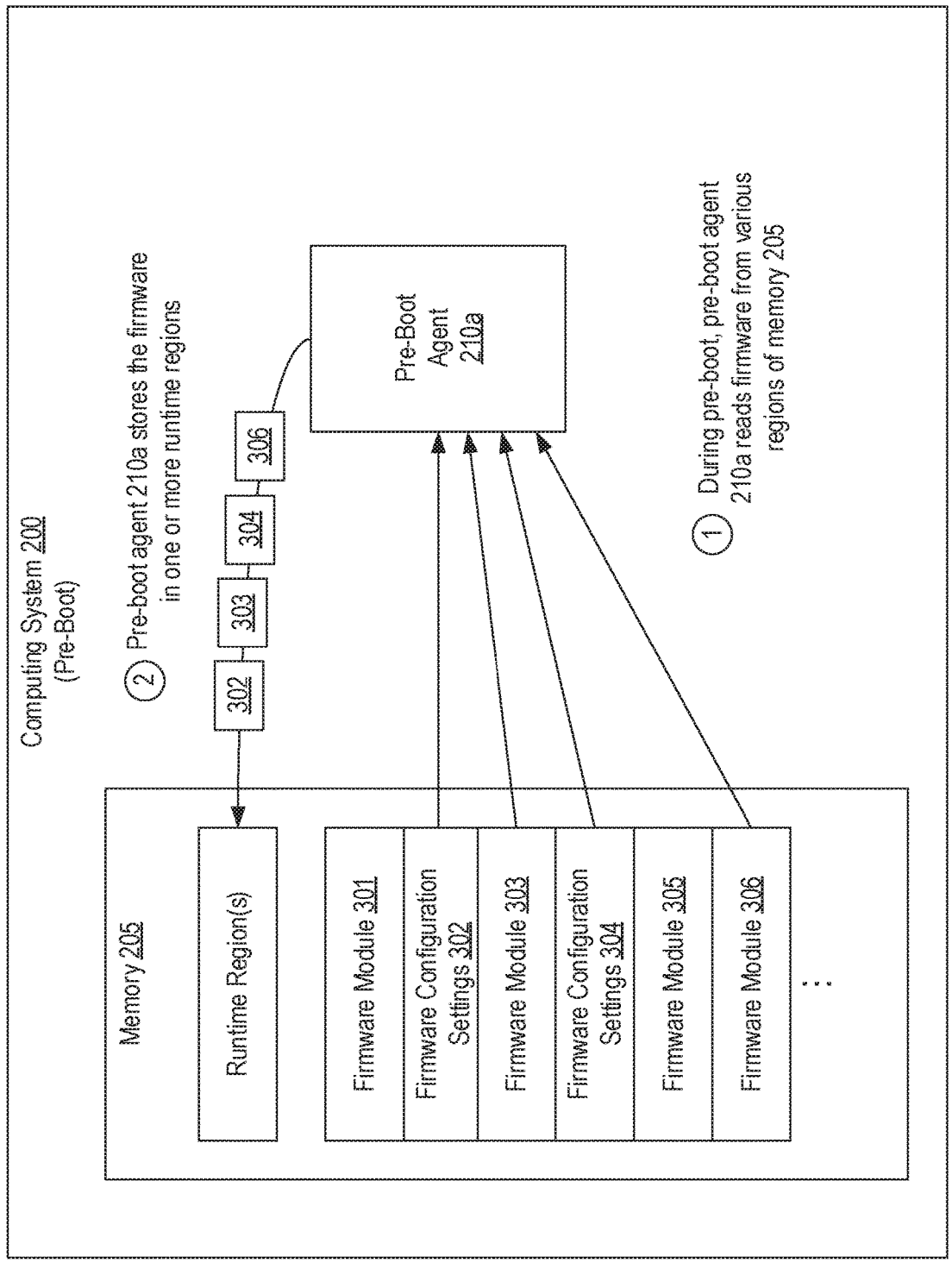
FIG. 5 provides another example of how firmware can be made accessible to an antivirus solution.

FIG. 5 is also similar to FIG. 3A and represents that pre-boot agent 210a may store the firmware in any other region of memory that will remain accessible at runtime. In such cases, pre-boot agent 210a may be configured as a runtime service so that it remains available at runtime to convey the firmware to runtime agent 210b. In other embodiments, however, pre-boot agent 210a may not be a runtime service, and runtime agent 210b may be configured to read the firmware from the runtime regions of memory 205 using any available technique.

In summary, embodiments of the present invention encompass various techniques for conveying firmware to the OS context where it can be analyzed using statistics-based techniques. These embodiments may be primarily beneficial for evaluating memory regions that contain dynamic firmware where traditional hash or signature-based techniques do not work but can equally be employed to evaluate any region of memory including those that contain static firmware. Because the firmware is converted into files that provide context of what the firmware is, an AV solution can perform a statistical analysis on the firmware without needing to be "firmware aware." In other words, the AV solution does not need to understand how the firmware is structured or even be configured to access the firmware.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for analyzing firmware, the method comprising:
   during pre-boot, accessing firmware stored in one or more regions of memory;
   during pre-boot, storing the firmware in one or more separate regions of memory that remain accessible at runtime;
   during runtime, accessing the firmware that is stored in the one or more separate regions of memory; and
   during runtime, storing the firmware as one or more files in a file system at a location accessible to an antivirus solution to thereby enable the antivirus solution to perform a statistical analysis on the one or more files to detect a compromise in the firmware.

2. The method of claim 1, wherein the one or more regions of memory comprise at least one memory region that stores dynamic firmware.

3. The method of claim 2, wherein the dynamic firmware includes firmware configuration settings.

4. The method of claim 1, wherein storing the firmware in the one or more separate regions of memory comprises storing the firmware in one or more Advanced Configuration and Power Interface (ACPI) tables.

5. The method of claim 1, wherein accessing the firmware that is stored in the one or more separate regions of memory comprises reading the firmware from the one or more ACPI tables.

6. The method of claim 1, wherein storing the firmware in the one or more separate regions of memory comprises storing the firmware in an ACPI non-volatile (NV) region of memory.

7. The method of claim 6, wherein accessing the firmware that is stored in the one or more separate regions of memory comprises reading the firmware from the ACPI NV region of memory.

8. The method of claim 1, wherein the firmware comprises multiple portions of firmware, and wherein storing the firmware in the file comprises storing each portion of firmware as a separate file in the file system.

9. The method of claim 1, further comprising:
   accessing the file system to analyze the firmware.

10. The method of claim 9, wherein the firmware is analyzed using a statistics-based technique.

11. The method of claim 1, further comprising:
    during a subsequent pre-boot:
       accessing the firmware stored in one or more regions of memory;
       storing the firmware in one or more separate regions of memory that remain accessible at runtime;
    during a subsequent runtime corresponding to the subsequent pre-boot:
       accessing the firmware that is stored in the one or more separate regions of memory; and
       storing the firmware in the file system in conjunction with the firmware that was previously stored in the file system.

12. The method of claim 11, further comprising:
    accessing the file system to analyze the firmware that was stored during the subsequent runtime against the firmware that was previously stored in the file system.

13. One or more computer storage media storing computer executable instruction which when executed on a computing system implement a method for analyzing firmware, the method comprising:
    during pre-boot, accessing one or more portions of firmware that are stored in one or more regions of memory;
    during pre-boot, storing the one or more portions of firmware in memory in a manner that causes the one or more portion of firmware to remain accessible during runtime; and
    during runtime, storing the one or more portions of firmware as one or more files in a file system to thereby enable an antivirus solution to perform a statistical analysis on the one or more files to detect a compromise in the firmware.

14. The computer storage media of claim 13, wherein storing the one or more portions of firmware in memory in a manner that causes the one or more portion of firmware to remain accessible during runtime comprises one or more of:
storing the one or more portions of firmware in one or more Advanced Configuration and Power Interface (ACPI) tables; or
storing the one or more portions of firmware in an ACPI non-volatile (NV) region of memory.

15. The computer storage media of claim 13, wherein the one or more portions of firmware that are stored in one or more regions of memory comprise firmware configuration settings.

16. The computer storage media of claim 13, wherein storing the one or more portions of firmware in the file system comprises creating a separate file in the file system for each of the one or more portions of firmware.

17. The computer storage media of claim 13, wherein the method further comprises:
accessing the file system to evaluate the one or more portion of firmware using a statistics-based technique.

18. A computing system comprising:
one or more processors; and
one or more computer storage media storing computer executable instructions which when executed by the one or more processors implement a method for enabling firmware to be analyzed at runtime, the method comprising:
loading, during pre-boot, a pre-boot agent;
identifying, by the pre-boot agent, a memory region that stores firmware;
causing, by the pre-boot agent and during pre-boot, the firmware stored in the memory region to be copied to a portion of memory that remains accessible at runtime;
accessing, at runtime and by a runtime agent, the portion of memory that remains accessible at runtime to obtain the firmware; and
storing the firmware as one or more files in a file system to thereby enable an antivirus solution to perform a statistical analysis on the one or more files to detect a compromise in the firmware.

19. The computing system of claim 18, wherein the firmware comprises firmware configuration settings.

20. The computing system of claim 18, wherein the portion of memory that remains accessible at runtime comprises an Advanced Configuration and Power Interface (ACPI) region of memory.

* * * * *